United States Patent [19]

Asano et al.

[11] Patent Number: 4,993,521

[45] Date of Patent: Feb. 19, 1991

[54] TREAD BRAKE UNIT

[75] Inventors: Yoshio Asano; Takeshi Kishimoto; Mitugu Tunazawa, all of Kobe, Japan

[73] Assignee: Nippon Air Brake Co., Ltd., Kobe, Japan

[21] Appl. No.: 395,376

[22] Filed: Aug. 17, 1989

[30] Foreign Application Priority Data

Aug. 26, 1988 [JP] Japan .................. 63-112622[U]

[51] Int. Cl.[5] ........................................... F16D 65/56
[52] U.S. Cl. ..................... 188/203; 92/140; 188/75; 188/153 R; 188/198
[58] Field of Search ............... 188/202, 203, 198, 75, 188/76, 153 R, 153 A, 153 D, 79.51, 79.54, 79.56, 199, 200, 196 BA; 92/140

[56] References Cited

U.S. PATENT DOCUMENTS

| 2,940,553 | 6/1960 | Newell et al. | 188/202 X |
| 3,017,960 | 1/1962 | Hursen et al. | 188/203 X |
| 3,131,788 | 5/1964 | Newell | 188/202 X |
| 3,707,208 | 12/1972 | Kyllonen | 188/202 |
| 4,607,729 | 8/1986 | Staltmeir et al. | 188/153 R |
| 4,909,360 | 3/1990 | Langley | 188/203 |

FOREIGN PATENT DOCUMENTS 1198378 12/1985 Canada .................. 188/198

Primary Examiner—Douglas C. Butler
Attorney, Agent, or Firm—G. J. Falce

[57] ABSTRACT

A tread brake unit including a spring actuated compensating mechanism for maintaining the brake unit piston stroke constant. A roller associated with the compensating mechanism is adapted to ride along an operating surface of a lever arm that rotates according to the degree of piston stroke. The profile of this operating surface regulates the roller movement to prevent the stressing of operating springs in the compensating mechanism from exceeding a maximum value corresponding to their fatigue limit.

7 Claims, 5 Drawing Sheets

TREAD BRAKE UNIT

BACKGROUND OF THE INVENTION

This invention relates to a tread brake unit for a railroad car, and in particular, to an improved automatic stroke adjustment mechanism of the tread brake unit.

Known tread brake units of this type in the prior art include the one indicated in Patent Kokai No. 59-192666, and the structure of this tread brake unit will be explained first with reference to the accompanying FIGS. 3 and 4.

There is a brake cylinder 3 on the upper side of the main body 2 of tread brake unit 1. The output of this brake cylinder 3 is transferred from piston 4 to the cylinder main lever 5 extending in body 2 in a vertical direction. The above-mentioned cylinder lever 5 can move forward and backward (a-b direction in FIG. 3) about the fulcrum pin 6 provided at the bottom part of the main body 2. At the same time, the sheath rod 8, which extends in the forward and backward direction, is connected to the spherical bearing 7 at the middle part of the cylinder main lever 5, so that it can rotate around the central axis, and in addition, there is a threaded bore of sheath rod 8. A push rod 9, the front end (left end part) 9a of which protrudes outside the main body 2, is screw-threaded to the bore of this sheath rod 8, and the brake shoe 10 is connected to the front end 9a of sheath rod 8. In addition, the front end 9a is supported by a brake shoe hanger 11 suspended at the side of the upper part of the main body 2 so that it can move forward and backward. In addition, there is a hand brake lever 12 in the upper center part of the main body 2, to move the above-mentioned cylinder main lever 5 manually. Therefore, when the above-mentioned cylinder main lever 5 is moved forward (direction a in FIG. 3) around pin 6, which is the fulcrum, by operating the above-mentioned hand brake lever 12 or by transferring the output of the brake cylinder 3, the sheath rod 8 and the push rod 9 become one and move forward, and because of this, the brake shoe head 10 is pushed against the wheel tread surface, and a specified brake force is generated.

In addition, this tread brake unit 1 is equipped with an automatic adjusting mechanism 20 to maintain the gap between the brake shoe and wheel tread a specified value irrespective of the wear of the wheel and the brake shoe contact surfaces.

This automatic gap adjusting mechanism 20 includes a lever arm 21 which is fixed at the lower end of the above-mentioned cylinder lever 5 and which also extends to the rear of the brake unit: a lever rod 23 which has a roller 22 that rides on the upper surface of lever arm 21, and which can move in the vertical direction, while at the same time moving forward and backward in an interlocked manner with the forward and backward movement of the above-mentioned sheath rod 8; a compression spring 24 which acts downwardly on lever pusher rod 23; a lever 26, the middle part of which is supported by a fulcrum pin 25 so that it can rotate, one end being connected to the above-mentioned lever push rod 23; a pawl 27 which is connected to the other end of lever 26; and a ratchet gear 28 which is press-fit on the circumference of the above-mentioned sheath rod 8. The above-mentioned pawl 27 is pulled in an upward direction by tension spring 29, and because of the spring force of tension spring 29, a side surface of the above-mentioned pawl 27 is pressed onto the tips of the teeth of ratchet gear 28.

With such a structure, when the brake is released, the mechanism assumes the position indicated in FIG. 3 and FIG. 4; in other words, there is a certain gap between the roller 22 at the lower end of the lever push rod 23 and the lever arm 21 of the lower end of the cylinder main lever 5. In addition, the lever push rod 23 is pushed down to the lower moving end by the compression spring 24. When the cylinder main lever 5 moves forward from this state, the sheath rod 8 and the push rod 9 move forward, and the lever arm part 21 of the lower end of cylinder main lever 5 moves upwardly (direction c in the FIG. 3) and touches the roller 22 and pushes the lever push rod 23 in an upward direction against the force of compression spring 24. When the lever push rod 23 moves up in this manner, the lever 26, one end of which is connected to lever push rod 23, rotates around the fulcrum pin 25 clockwise in FIG. 4. Simultaneously, the pawl 27, which is connected to the other end of lever 26, slides down along the tips of the teeth of the ratchet gear 28 against the force of the tension spring 29. In this case, when the shoe gap between the above-mentioned brake shoe 10 and the contact surface of the wheel is within the specified value, the distance moved by the cylinder main lever 5 in the direction a, and the distance moved by the lever arm 21 in the direction c, are less than a certain value. Therefore, when the above-mentioned pawl 27 reaches its lower position, the upper end meshing surface 27a of pawl 27 does not go over the tips of the teeth of the ratchet gear 28 in the specified position. Therefore, in this case, even if the cylinder main lever 5 moves in the direction b and the pawl 27 moves up from its lower position, pawl 27 only slides over the tips of the teeth of the ratchet gear 28, and ratchet gear 28 does not rotate. Also, a spring stop 30 is in contact with the upper part of the ratchet gear 28 with an appropriate pressure, and prevents the unintentional rotation of ratchet gear 28 while the above-mentioned pawl 27 slides over the tips of the teeth of the ratchet gear 28.

On the other hand, when the shoe space becomes more than the specified value as a result of wear on the brake shoe 10 and/or the contact surface of the wheel, the distance moved by the cylinder lever 5 in the direction a, and the distance moved by the lever arm 21 in the direction c, become more than a certain value. Consequently, the above-mentioned pawl 27 reaches its lower position in which the upper end meshing surface 27a of pawl 27 rides over the tips of the teeth of the ratchet gear 28 and into meshing engagement with the teeth. When the cylinder main lever 5 subsequently moves in the direction b, and the pawl 27 is raised from its lower position by the stored spring force, the ratchet gear 28 is rotated counterclockwise in FIG. 4 by the amount of one tooth, and at the same time, the sheath rod 8, in which the ratchet gear 28 is press-fit, also rotates in the same direction. As a result of the rotation of sheath rod 8, push rod 9, which is screw-threaded with sheath rod 8, is extended forward according to the pitch of the screw.

The gap between the brake shoe and the contact surface of the wheel can be kept constant at the specified value by the above-mentioned movement.

A tread brake unit 1 of the above-mentioned type is usually installed on a railroad flatcar 40 having a wheel 41, as shown in FIG. 5. The above-mentioned wheel 41 supports the flatcar 40, as can be seen in the figure via bearing 42 and laminated rubber members 43, therefore giving rise to the problem hereinafter described.

Namely, when tread brake unit 1 operates and the brake shoe 10 is forced into contact with the tread of wheel 41, the laminated rubber members 43 are deformed by this pressure force, and the bearing 42 (axle) moves in the direction of the applied force, so that the stroke of the above-mentioned brake shoe 10 must be greater than before. In addition, with such a support method, the flatcar 40 moves up and down depending on the loading weight (see FIG. 6), and the shoe gap distance L between the wheel 41 and the brake shoe 10, changes. Therefore, to compensate for this too, the stroke of the brake shoe 10 must be increased.

When the stroke of the brake shoe 10 is increased for the reason mentioned above, the distance the cylinder main lever 5 moves in the direction of a in FIG. 3 increases and the distance the lever arm 21 moves in the direction of c in the same figure inevitably increases. In addition, the upper surface of lever arm part 21 is substantially linear, so that the distance the lever push rod 23 moves upwardly increases and the distance the pawl 27 moves downwardly also increases. Therefore, the amount of compression of spring 24 and the amount of extension of tension spring 29 also increases. In this case, both of the above-mentioned springs 24 and 29 act to extend the push rod 9 by rotating the ratchet gear 28 and the sheath rod 8 by the force of the springs when the gap is adjusted. These springs also are subjected to installation space limitations, so that they are both small in diameter and are designed to generate strong spring forces. Therefore, both these springs are usually designed to operate in a range approaching their fatigue limit. Under such operating conditions, when the compression and tension of these spring 24 and 29 increases, as described above, both springs 24 and 29 exceed their fatigue limit strength while still in use, and the springs 24 and 29 are caused to fail prematurely, which is a disadvantage. As can be seen in FIG. 7, when the stress amplitude of spring 24 and spring 29 under operating conditions is plotted on the vertical axis, and the average stress is plotted on the horizontal axis, the fatigue limit curve of said spring becomes the curve indicated by X. Normally, the above-mentioned springs 24 and 29 operate in the position indicated by point A in the figure, but when the displacement of both springs 24 and 29 increases for the reason mentioned above, the fatigue limit of the springs shifts to the point indicated by B, thereby causing premature spring failure, as mentioned above.

SUMMARY OF THE INVENTION

The object of this invention is to provide an improved tread brake unit stroke adjusting mechanism in which the spring component's normal service life is assured by maintaining the maximum spring stress within the spring fatigue limit irrespective of variance in piston stroke.

In accordance with the foregoing objective, there is provided for a railway vehicle a tread brake unit comprising a cylinder, a piston operable in the cylinder between a brake release position and brake application position in which a brake shoe is engageable with the tread of a wheel of the railway vehicle, a main lever fulcrumed at one end and pivotally connected at its other end to the piston, and a push rod that has screw-threaded engagement with the bore of a sheath rod that is pivotally connected to the main lever at a point intermediate its ends, the push rod being connected to the brake shoe for applying braking force to the wheel tread with mechanical advantage.

Compensating means is provided to maintain the stroke of the piston constant including a toothed ratchet wheel fixed to the perimeter of the sheath rod, a lever arm projecting from the fulcrum end of the main lever and having an operating surface the profile of which corresponds to a reverse V-shape, a pawl engageable with the ratchet wheel teeth when the stroke of the piston exceeds a predetermined value, spring means stressed during the brake application stroke in order to exert a spring force on the pawl during the brake release stroke in order to effect rotation of the ratchet wheel and sheath rod and thereby extend the push rod relative to the sheath rod to compensate the excess piston stroke.

The operating surface of the lever arm acts on a roller that is part of the mechanism by which the spring means is stressed, a first sloped portion of the operating surface progressively increases the spring stress through a predetermined piston stroke while a second oppositely sloped portion of the operating surface coacts with the roller during piston stroke exceeding the predetermined limit to prevent further stress of said spring means, so that the spring fatigue limit is not exceeded.

BRIEF DESCRIPTION OF THE DRAWINGS

This object and other objects and advantages of the invention will become more apparent from the following more detailed explanation when taken with the drawings in which.

DESCRIPTION AND OPERATION

In the example described above, when the cylinder main lever 5 is moved forward about its fulcrum point by receiving the output of the brake cylinder, the lever arm 21, which is fixed at the lower end of the cylinder main lever and also extends toward the rear (right), moves upward. The upper surface of the above-mentioned lever arm contacts the roller of the lower end of the lever push rod 23. At this point, the roller 22 rides on the back slope of the reverse V-shaped upper surface of the above-mentioned lever arm, namely, the surface that has the descending slope facing the right or back of the brake unit. When the cylinder main lever 5 moves further forward from this state, the sheath rod, located in the middle of the cylinder lever via the spherical bearing, also moves further forward, and simultaneously, the roller, which is at the lower end of the lever push rod and which is interlocked for back and forth movement with the sheath rod, moves forward. At the same time, the above-mentioned lever arm 21 moves further upward; therefore, the above-mentioned roller moves forward or leftward along the upper surface of the lever arm part. In this case, the roller moves forward along the above-mentioned descending slope of the upper surface of the lever arm, so that the roller and the lever push rod are gradually pushed up accompanying this movement.

When the cylinder main lever 5 moves further forward from this position, the above-mentioned roller passes over the apex of the upper surface of the lever arm, and moves forward along the front slope of the reverse V-shaped portion, namely, the slope which descends toward the left or front of the brake unit. In this case, the lever arm itself moves upward, but since the front slope descends in the forward direction at a certain slope angle, the lift of the above-mentioned roller does not increase further and it is maintained in the position of the specified height. The profile of the upper surface of the above-mentioned lever arm is set to correspond to a strength which is slightly lower than the fatigue limit strength of the compression spring and the tension spring which are deformed or stressed during the above-mentioned movement. In other words, in the extreme upper position of the roller, the deformation of the compression spring and the tension spring corresponds to a strength which is slightly lower than the fatigue limit strength, so that the above-mentioned springs will not be deformed beyond their fatigue limit.

One embodiment of this invention is explained in detail below, with reference to the accompanying FIG. 1 and FIG. 2.

Figure 3:
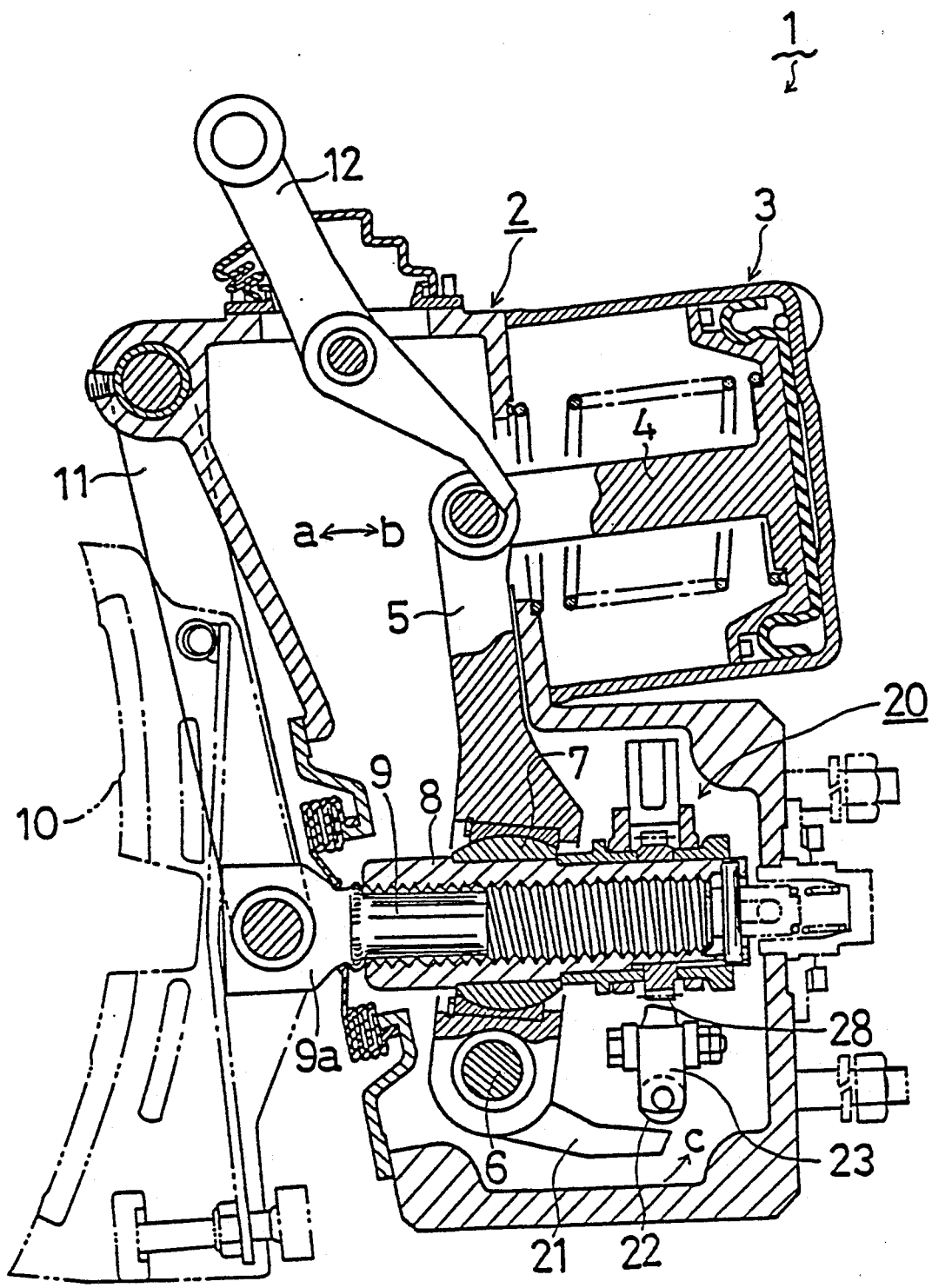
FIG. 3 is a side elevation view of a tread brake unit known in the prior art.
Figure 4:
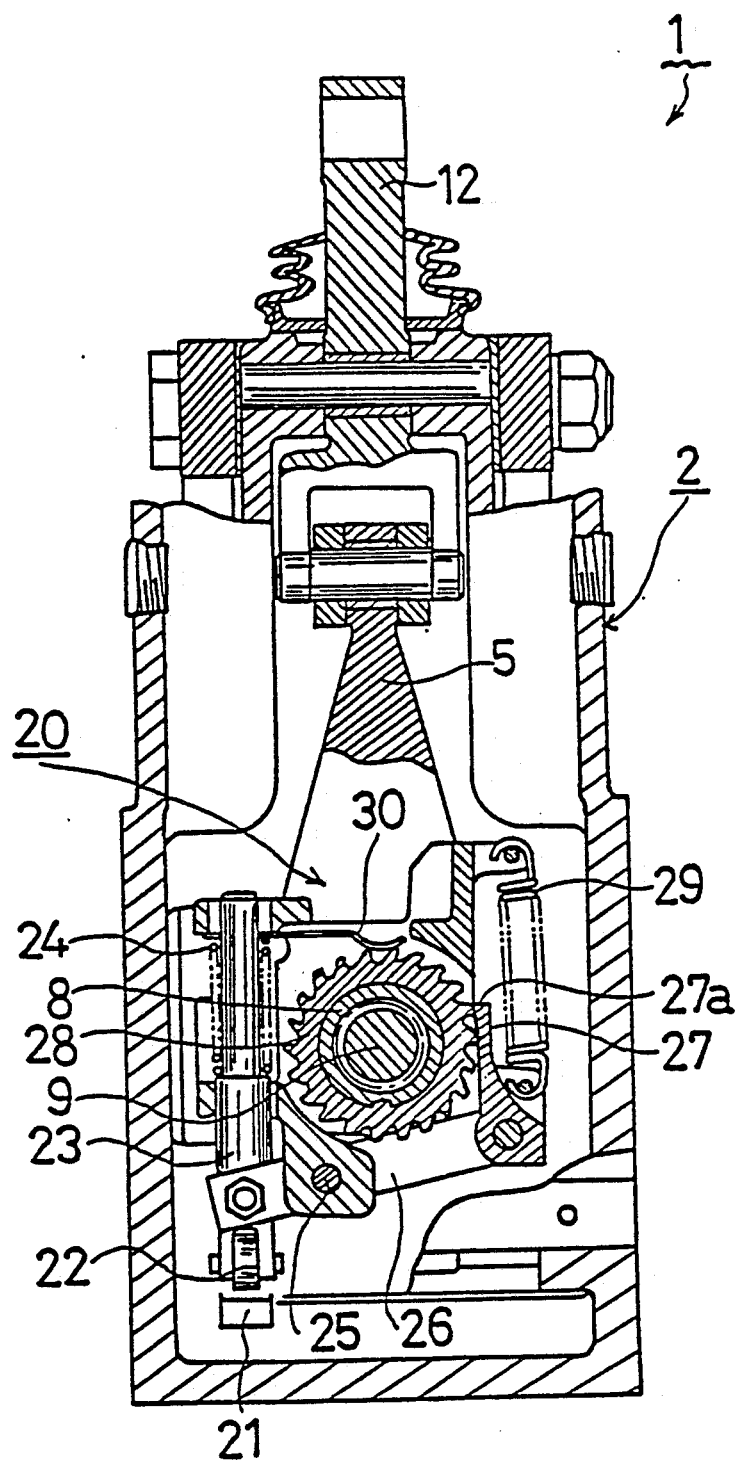
FIG. 4 is a front elevation view in cross-section of the prior art brake unit of FIG. 3.
Figure 5:
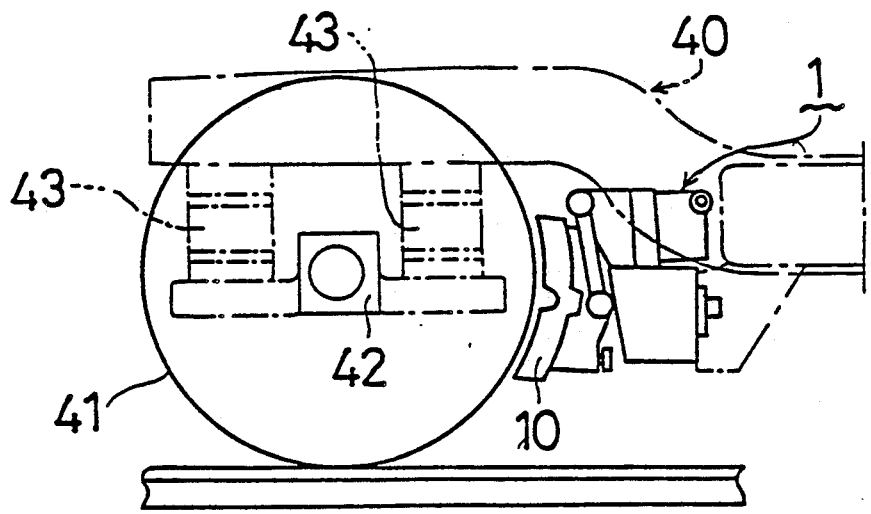
FIG. 5 is a side outline view showing a tread brake unit mounted on a railway vehicle.
Figure 6:
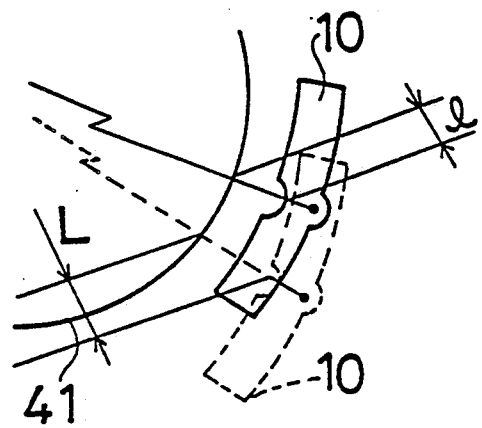
FIG. 6 is a diagrammatic view illustrating the problem encountered in the prior art which the invention overcomes.
Figure 7:
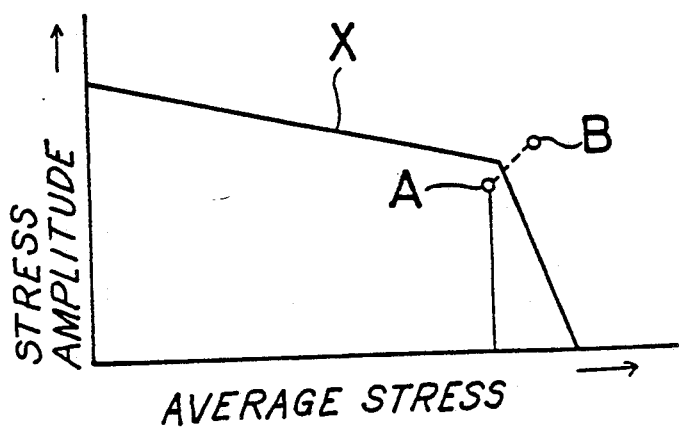
FIG. 7 is a curve that graphically illustrates the problem of the prior art.

The structural elements that are the same as those in the example of the prior art illustrated in FIG. 3 and FIG. 4 are identified by the same numbers, and no additional explanation of these parts is included here.

The difference between the tread brake unit of this invention and the example of the prior art is that the profile of the upper surface of lever arm 21 has been modified.

Figure 1:
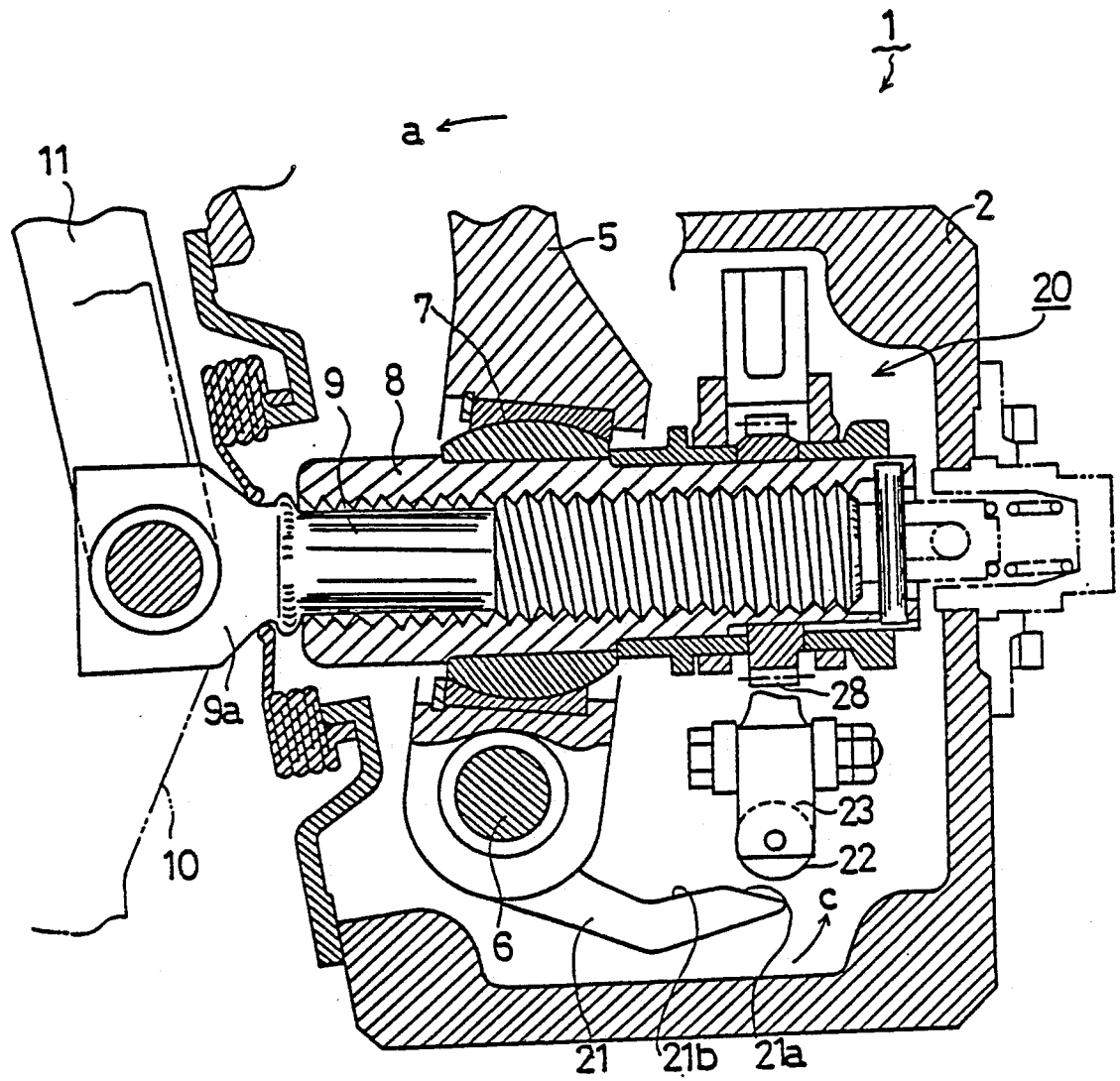
FIG. 1 is a side elevation view in cross-section showing a tread brake unit in accordance with the present invention.

In other words, as can be seen in FIG. 1, the range of movement of the roller 22 on the upper surface of the lever arm part 21 is divided into a back side slope 21a, which descends toward the rear of the brake unit, and the front side slope 21b which descends toward the front of the brake unit, thereby forming the upper surface with a profile having a reverse V-shape. In addition, the apex (intersecting position) of the above-mentioned slopes 21a and 21b is made to correspond to a strength which is slightly lower than the fatigue limit strength of the compression spring 24 and the tension spring 29 (see FIG. 4).

Figure 2:
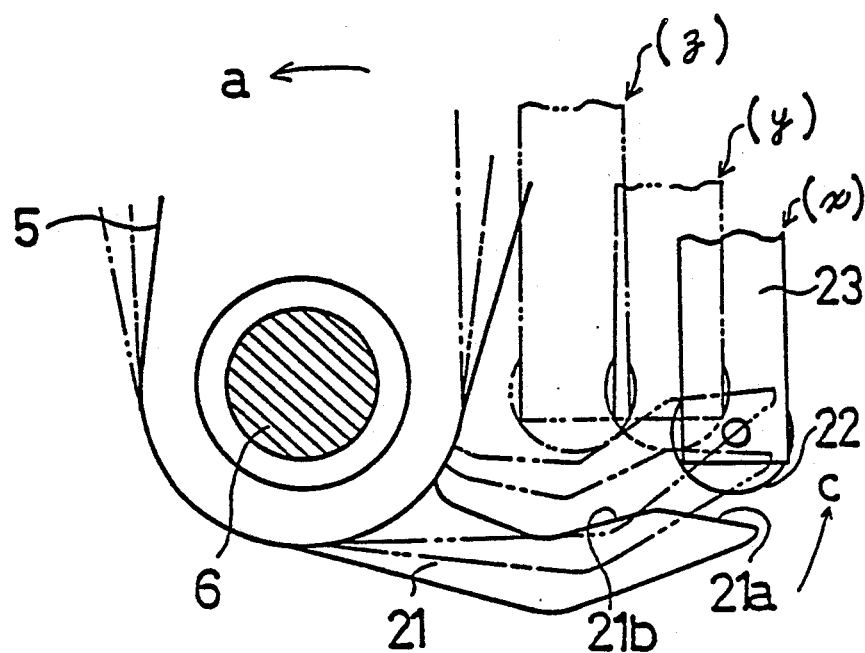
FIG. 2 is a partial side elevation view of the active part of the compensating means providing the basis for the present invention.

With such a structure, as can be seen in FIG. 2, when the lever arm 21 moves upward (direction c) accompanying the forward movement (direction a) of the cylinder main lever 5, first, the back side slope 21a of the upper surface of lever arm 21 engages roller 22 at the lower end of lever push rod 23, and lever push rod 23 moves forward interlocked with the sheath rod 8. At the same time, the lever arm 21 moves upward, so that the above-mentioned lever push rod 23 is pushed up from the position indicated by (x) to the position indicated by (y).

When the lever arm 21 moves upward at the same time as the lever push rod 23 moves forward, the above-mentioned roller 22 rides over the apex on the upper surface of the lever arm 21 and moves forward on the front side slope 21b, so that the lever push rod 23 moves from the position indicated by (y) to the position indicated by (z). Thus, when the roller 22 moves forward on the front side slope 21b of the lever arm 21, even though the lever arm 21 moves upward, the lever push rod 23 is maintained at substantially the same height, since the slope 21b of the front side descends in a forward direction at a certain slope angle. The angle of both the above-mentioned slopes 21a and 21b is selected so that the stress in the respective springs is slightly lower than their fatigue limit, whereby a situation is avoided in which the above-mentioned springs 24 and 29 are stressed beyond their fatigue limit.

As described above, by means of this invention, the upward movement of the lever push rod accompanying the movement of the cylinder lever and the lever arm would be limited to a specified height position, so that the displacement of the compression spring and the tension spring accompanying the upward movement of the lever push rod can be limited to a certain value. Therefore, even though the stroke of the brake shoe is large, the above-mentioned springs would not be displaced enough to exceed their fatigue limit, and the durability of the springs is accordingly improved.

We claim:

1. A tread brake unit for a railway vehicle comprising:
   (a) a cylinder;
   (b) a piston operable in said cylinder between a brake release position and a brake application position;
   (c) a brake shoe engageable with the tread of a wheel of said vehicle;
   (d) a main lever connected to said piston at one end and pivotally connected at the other end to a first fulcrum pin;
   (e) push rod means for transmitting movement of said piston to said brake shoe with mechanical advantage via said main lever; and
   (f) compensating means for maintaining the stroke of said piston between said brake release and application positions constant comprising:
      (i) said push rod means including:
         (a) a sheath rod connected to said main lever at a location intermediate said one end and said other end of said main lever and having a threaded bore; and
         (b) a push rod having screw-threaded engagement with said sheath rod via said threaded bore and being connected to said brake shoe, said brake shoe connection locking said push rod against rotation;
      (ii) a toothed ratchet wheel fixed on the periphery of said sheath rod;
      (iii) a lever arm projecting from said other end of said main lever so as to be rotatable therewith and having an operating surface;
      (iv) a pawl engageable with said ratchet wheel teeth when the stroke of said piston exceeds a predetermined amount;
      (v) spring means in which a source of energy is stored during said movement of said piston toward said brake application position for causing said pawl to effect rotation of said sheath rod in a direction to extend said push rod relative thereto during subsequent movement of said piston toward said brake release position;
      (vi) means including a roller engageable with said operating surface of said lever arm for progressively increasing the stress of said spring means during said movement of said piston toward said application position to provide said source of stored energy; and (vii) said operating surface of said lever arm having a backside sloped portion and a frontside sloped portion intersecting at an apex, said backside sloped portion traversing said roller in response to rotation of said main lever during said stroke of said piston toward said brake application position, the profile of said backside sloped portion being such as to effect said progressive increase of said stress of said spring means, said apex of said operating surface defining the limit of said backside sloped portion to thereby prevent said stress of said spring means from exceeding a maximum amount, said frontside sloped portion of said operating surface traversing said roller during said stroke of said piston toward said brake application position, the profile of said frontside sloped portion being such as to maintain said stress of said spring means at said maximum amount.

2. A tread brake unit as recited in claim 1, wherein said brake shoe/wheel engagement defines said brake application position.

3. A tread brake unit as recited in claim 2, wherein said roller engages said apex of said operating surface of said lever arm between said frontside and backside sloped portions in accordance with the stroke of said piston toward said application position being said predetermined amount.

4. A tread brake unit as recited in claim 3, wherein said spring means comprises first and second springs, said first spring being stressed in compression and said second spring being stressed in tension.

5. A tread brake unit as recited in claim 4, wherein said wear compensating means further comprises:
(a) a lever push rod having said roller at one end and supported on said sheath rod so as to be movable therewith in a plane of the axis of said bore during said movement of said piston between said brake release and said brake application positions;
(b) a lever rotatably supported by a second fulcrum pin at a location intermediate the ends thereof, one end of said lever being connected to said lever push rod and the other end connected to said second spring, said first spring being stressed in compression via said lever push rod and said second spring being stressed in tension in response to rotation of said lever during said movement of said piston to said brake application position.

6. A tread brake unit as recited in claim 5, wherein the profile of said frontside portion of said operating surface of said lever arm is selected such that said roller acting through said lever push rod imparts no further rotation of said lever during said movement of said piston to said application position a distance in excess of said predetermined distance.

7. A tread brake unit as recited in claim 6, wherein the maximum stress of said first and second springs is less than the fatigue limit thereof.

* * * * *